US009710386B1

(12) United States Patent
Zhang et al.

(10) Patent No.: US 9,710,386 B1
(45) Date of Patent: Jul. 18, 2017

(54) SYSTEMS AND METHODS FOR PREFETCHING SUBSEQUENT DATA SEGMENTS IN RESPONSE TO DETERMINING THAT REQUESTS FOR DATA ORIGINATE FROM A SEQUENTIAL-ACCESS COMPUTING JOB

(71) Applicant: Symantec Corporation, Mountain View, CA (US)

(72) Inventors: Xianbo Zhang, Plymouth, MN (US); Gaurav Makin, Roseville, MN (US); Steve Vranyes, Woodbury, MN (US); Sinh Nguyen, Eden Prairie, MN (US); Smitha Cauligi, Golden Valley, MN (US)

(73) Assignee: Veritas Technologies, Mountain View, CA (US)

( * ) Notice: Subject to any disclaimer, the term of this patent is extended or adjusted under 35 U.S.C. 154(b) by 742 days.

(21) Appl. No.: 13/961,685

(22) Filed: Aug. 7, 2013

(51) Int. Cl.
*G06F 12/00* (2006.01)
*G06F 9/26* (2006.01)
(Continued)

(52) U.S. Cl.
CPC ........ *G06F 12/0862* (2013.01); *G06F 9/4856* (2013.01); *G06F 9/5016* (2013.01); *G06F 12/00* (2013.01); *G06F 2212/151* (2013.01)

(58) Field of Classification Search
CPC .... G06F 12/00; G06F 12/0862; G06F 9/4856; G06F 9/5016; G06F 2212/151
(Continued)

(56) References Cited

U.S. PATENT DOCUMENTS 5,606,681 A 2/1997 Smith et al.
6,912,631 B1 6/2005 Kekre et al.
(Continued)

FOREIGN PATENT DOCUMENTS

EP 2234018 9/2010

OTHER PUBLICATIONS

Manning, Paul, "Best Practices for running VMware vSphere on Network Attached Storage", http://www.vmware.com/files/pdf/techpaper/VMware-NFS-BestPractices-WP-EN.pdf, as accessed on Oct. 8, 2014, White Paper, VMware, (May 19, 2010).
(Continued)

*Primary Examiner* — Mark Giardino, Jr.
*Assistant Examiner* — Shane Woolwine
(74) *Attorney, Agent, or Firm* — FisherBroyles LLP (57) ABSTRACT

A computer-implemented method for prefetching subsequent data segments may include (1) identifying a storage system that receives sequential read requests from a sequential-access computing job and random-access read requests from a random-access computing job, (2) observing a plurality of requests to read a plurality of data segments stored by the storage system, (3) determining that the plurality of data segments are stored contiguously by the storage system and that the plurality of requests originate from the sequential-access computing job, and (4) prefetching a subsequent data segment that is directly subsequent to the plurality of data segments in response to determining that the plurality of requests originate from the sequential-access computing job. Various other methods, systems, and computer-readable media are also disclosed.

20 Claims, 7 Drawing Sheets

(51) Int. Cl.
*G06F 9/34* (2006.01)
*G06F 12/0862* (2016.01)
*G06F 9/50* (2006.01)
*G06F 9/48* (2006.01)

(58) Field of Classification Search
USPC .................. 711/204, 154, 113; 718/100, 104
See application file for complete search history.

(56) References Cited

U.S. PATENT DOCUMENTS

| | | |
|---|---|---|
| 6,931,558 B1 | 8/2005 | Jeffe et al. |
| 7,024,527 B1 | 4/2006 | Ohr |
| 7,093,086 B1 | 8/2006 | van Rietschote |
| 7,194,487 B1 | 3/2007 | Kekre et al. |
| 7,293,146 B1 | 11/2007 | Kekre et al. |
| 7,356,679 B1 | 4/2008 | Le et al. |
| 7,480,822 B1 | 1/2009 | Arbon et al. |
| 7,552,358 B1 | 6/2009 | Asgar-Deen et al. |
| 7,631,020 B1 | 12/2009 | Wei et al. |
| 7,669,020 B1 | 2/2010 | Shah |
| 7,721,138 B1 | 5/2010 | Lyadvinsky et al. |
| 7,797,281 B1 | 9/2010 | Greene et al. |
| 7,805,631 B2 | 9/2010 | Fries |
| 7,809,693 B2 | 10/2010 | Lango et al. |
| 7,827,150 B1 | 11/2010 | Wu et al. |
| 7,831,550 B1 | 11/2010 | Pande et al. |
| 7,831,861 B1 | 11/2010 | Greene et al. |
| 7,937,545 B1 | 5/2011 | Wu et al. |
| 7,937,547 B2 | 5/2011 | Liu et al. |
| 8,019,732 B2 | 9/2011 | Paterson-Jones et al. |
| 8,046,550 B2 | 10/2011 | Feathergill |
| 8,060,476 B1 | 11/2011 | Afonso et al. |
| 8,099,391 B1 | 1/2012 | Monckton |
| 8,117,168 B1 | 2/2012 | Stringham |
| 8,135,748 B2 | 3/2012 | Rosikiewicz et al. |
| 8,140,906 B1 | 3/2012 | Searls et al. |
| 8,161,321 B2 | 4/2012 | Zheng et al. |
| 8,185,505 B1 | 5/2012 | Blitzer et al. |
| 8,209,290 B1 | 6/2012 | Dowers, II et al. |
| 8,209,680 B1 | 6/2012 | Le et al. |
| 8,219,769 B1 | 7/2012 | Wilk |
| 8,230,187 B1 | 7/2012 | Krinke, II et al. |
| 8,239,646 B2 | 8/2012 | Colbert et al. |
| 8,261,282 B1 | 9/2012 | Ponnapur et al. |
| 8,290,912 B1 | 10/2012 | Searls et al. |
| 8,307,177 B2 | 11/2012 | Prahlad et al. |
| 8,315,983 B1 | 11/2012 | Sumant et al. |
| 8,315,986 B1 | 11/2012 | Kapoor et al. |
| 8,332,689 B2 | 12/2012 | Timashev et al. |
| 8,346,726 B2 | 1/2013 | Liu et al. |
| 8,346,727 B1 | 1/2013 | Chester et al. |
| 8,346,891 B2 | 1/2013 | Safari et al. |
| 8,355,407 B2 | 1/2013 | Wookey et al. |
| 8,386,733 B1 | 2/2013 | Tsaur et al. |
| 8,397,088 B1 | 3/2013 | Ghose |
| 8,402,309 B2 | 3/2013 | Timashev et al. |
| 8,438,349 B2 | 5/2013 | Olson et al. |
| 8,443,166 B2 | 5/2013 | Czezatke et al. |
| 8,464,254 B1 | 6/2013 | Vohra et al. |
| 8,473,463 B1 | 6/2013 | Wilk |
| 8,489,552 B1 | 7/2013 | Dowers, II et al. |
| 8,489,830 B2 | 7/2013 | Wu et al. |
| 8,510,271 B1 | 8/2013 | Tsaur et al. |
| 8,527,990 B1 | 9/2013 | Marathe et al. |
| 8,555,009 B1 | 10/2013 | Majahan et al. |
| 8,565,545 B1 | 10/2013 | Syed et al. |
| 8,566,640 B2 | 10/2013 | Timashev et al. |
| 2003/0009633 A1* | 1/2003 | Hill .................. G06F 9/383 711/137 |
| 2006/0265552 A1* | 11/2006 | Davis .................. G06F 12/0862 711/137 |
| 2007/0043860 A1 | 2/2007 | Pabari |
| 2008/0155223 A1 | 6/2008 | Hiltgen et al. |
| 2008/0243953 A1 | 10/2008 | Wu et al. |
| 2009/0172666 A1 | 7/2009 | Yahalom et al. |
| 2009/0249284 A1 | 10/2009 | Antosz et al. |
| 2009/0313447 A1 | 12/2009 | Nguyen et al. |
| 2010/0049902 A1* | 2/2010 | Kakihara .............. G06F 12/0873 711/103 |
| 2010/0058106 A1 | 3/2010 | Srinivasan et al. |
| 2010/0077137 A1 | 3/2010 | Soemo et al. |
| 2010/0107158 A1 | 4/2010 | Chen et al. |
| 2010/0115332 A1 | 5/2010 | Zheng et al. |
| 2010/0169592 A1 | 7/2010 | Atluri |
| 2010/0262586 A1 | 10/2010 | Rosikiewicz et al. |
| 2010/0268568 A1 | 10/2010 | Ochs et al. |
| 2011/0119462 A1 | 5/2011 | Leach et al. |
| 2011/0173405 A1 | 7/2011 | Grabarnik et al. |
| 2011/0271010 A1 | 11/2011 | Kenchammana et al. |
| 2011/0276539 A1 | 11/2011 | Thiam |
| 2012/0017114 A1 | 1/2012 | Timashev et al. |
| 2012/0109897 A1 | 5/2012 | Janakiraman et al. |
| 2012/0110279 A1* | 5/2012 | Fredricksen ...... G06F 17/30079 711/154 |
| 2012/0151273 A1 | 6/2012 | Ben Or et al. |
| 2013/0007854 A1* | 1/2013 | Sorenson, III ...... H04L 63/0823 726/5 |
| 2014/0067763 A1 | 3/2014 | Jorapurkar et al. |

OTHER PUBLICATIONS

"vSphere Storage—ESXi 5.0, vCenter Server 5.0", http://pubs.vmware.com/vsphere-50/topic/com.vmware.ICbase/PDF/vsphere-esxi-vcenter-server-50-storage-guide.pdf, as accessed on Oct. 8, 2014, VMware, Inc., (Nov. 8, 2011).

"Symantec NetBackup for VMware Administrator's Guide—Release 7.5", http://kbdownload.symantec.com/resources/sites/BUSINESS/content/live/DOCUMENTATION/5000/DOC5162/en_US/NetBackup7.5_AdminGuide_VMware.pdf?_gda_=1411393770_c2402ef79d42f0c9f8c7a29f0e476017, as accessed on Oct. 8, 2014, Symantec Corporation, (Jan. 12, 2012).

Atul Akolkar, et al; Systems and Methods for Enhancing Virtual Machine Backup Image Data; U.S. Appl. No. 12/950,972, filed Nov. 19, 2010.

Subash Rajaa, et al; Systems and Methods for Managing Multipathing Configurations for Virtual Machines; U.S. Appl. No. 13/548,195, filed Jul. 12, 2012.

Subash Rajaa, et al; Systems and Methods for Facilitating Substantially Continuous Availability of Multi-Tier Applications Within Computer Clusters; U.S. Appl. No. 13/524,367, filed Jun. 15, 2012.

Shailesh Vaman Marathe, et al; Systems and Methods for Migrating Virtual Machines; U.S. Appl. No. 13/097,635, filed Apr. 29, 2011.

Check Sabjan, et al; Systems and Methods for Enabling Virtual Environments to Mount Non-Native Storage Disks; U.S. Appl. No. 13/863,886, filed Apr. 16, 2013.

Subash Rajaa; Systems and Methods for Managing Affinity Rules in Virtual-Machine Environments; U.S. Appl. No. 13/686,330, filed Nov. 27, 2012.

Deb Banerjee; Systems and Methods for Workload Security in Virtual Data Centers; U.S. Appl. No. 13/291,716, filed Nov. 8, 2011.

Deb Banerjee; Systems and Methods for Enforcing Secure Network Segmentation for Sensitive Workloads; U.S. Appl. No. 13/945,373, filed Jul. 18, 2013.

Davies, Alex, "NetBackup Disk Based Date Protection Options", Symantec Corporation, (Oct. 2007).

Gaurav Makin, et al; Systems and Methods for Restoring Distributed Applications Within Virtual Data Centers; U.S. Appl. No. 13/972,426, filed Aug. 21, 2013.

Gaurav Makin, et al.; Systems and Methods for Instantly Restoring Virtual Machines in High Input/Output Load Environments; U.S. Appl. No. 13/944,507, filed Jul. 17, 2013.

Atul Khandelwal, et al.; Systems and Methods for Managing Virtual Machine Backups; U.S. Appl. No. 13/954,602, filed Jul. 30, 2013.

"Symantec Declares Deduplication Everywhere", Symantec Corporation; Press Release, (Jul. 7, 2009).

Simpson, Dave "PHD Virtual Improves VM Backups", Infostor, vol. 13, No. 6, (Jun. 1, 2009).

(56) References Cited

OTHER PUBLICATIONS

"Arkeia Delivers New vStorage-based Backup Agent for VMWare", PR Newswire, (Jun. 30, 2010).
"CA Inc: CA Delivers Comprehensive Recovery Management to Support Data Storage, Backup and Recovery; New Releases of CA ARCserve Backup and CA XOsoft Leverage Virtualization, Data Deduplication, Storage Resource Management and DR Testing to Support Lean IT", M2 PressWIRE, (Apr. 27, 2009).
Komiega, Kevin "Symantec to expand deduplication.", Infostor, vol. 13, No. 8, (Aug. 1, 2009).
"Customer FAQ-Symantec Backup Exec 12.5 for Windows Servers and Symantec Backup Exec System Recovery 8.5", Symantec Corporation, (Aug. 2008).
Fegreus, Jack, "Analysis: Minimizing System Risk via End-to-End Backup and Recovery Process Automation", openBench Labs, (Sep. 10, 2009).
"Complete Data Protection for VMWare Virtual Environments", Hewlett-Packard, ESG Research Report, ESG IT Infrastructure and Service Management Survey, (Mar. 2008).
"Symantec NetBackup for VMWare Administrator's Guide, UNIX, Windows, and Linux, Release 7.0.1", Symantec Corporation, (2010).
"Symantec NetBackup Administrator's Guide, vol. 1, UNIX and Linux, Release 7.0.1", Symantec Corporation, (2010).
"File Level Restore, VMware Data Recovery 1.0", VMware, Inc., (2009).
"Administration Guide, Site Recovery Manager 1.0 Update 1", VMware, Inc., (2008).
"vSphere Web Services SDK Programming Guide, vSphere Web Services SDK 4.0", VMware, Inc., (2009).
"vSphere Basic System Administration, vCenter Server 4.0, ESX 4.0, ESXi 4.0", VMware, Inc., (2009-2011).
"Optimized Backup and Recovery for VMware Infrastructure with EMC Avamar", VMware, Inc., White Paper, (2007).
"Symantec NetBackup PureDisk Getting Started Guide, Windows Linux, and Unix, Release 6.6, Publication release 6.6, revision 2", Symantec Corporation, (2009).
"Veeam Backup & Replication v5 Preview—SureBackup, U-AIR and Instant VM Recovery", http://www.veeam.com/blog/veeam-backup-replication-v5-preview-surebackup-u-air-and-instant-vm-recovery.html, (Aug. 15, 2010).
Gostev, Anton "Migration (VMware: [FAQ] Frequently Asked Questions)", http://forums.veeam.com/viewtopic.php?f=24&t=9329#p39955, Veeam Community Forums, (Nov. 2011).
Arts, Henk "Veeam Backup and Replication v5", http://www.slideshare.net/henkarts/veeam-backup-and-replication-v5, Veeam Software Inc., (Nov. 1, 2010).
Hazelman, Doug "vPower DEMO: Instant VM Recovery, U-AIR, Instant File-Level Restore", http://www.youtube.com/watch?v=zbZMsk2Prgw, (Jan. 28, 2011).
"Veeam Backup & Replication 5.0: User Guide", http://www.veeam.com/files/guide/veeam_backup_5_0_user_guide.pdf, Veeam Software Inc., (Oct. 2010).
Paul, Justin "Veeam vPower Instant Recovery", http://jpaul.me/?p=1425, Justin's ITBlog, (Mar. 24, 2011).
Makin, Gaurav et al., "Method to Reduce the RTO of an Application by Running the Application Directly from its Backup Image in a Virtualization Environment", http://ip.com/IPCOM/000217035, Symantec Corporation, (Apr. 27, 2012).
"Veeam Backup & Replication: What's New in v6", http://www.vmc-company.ru/pdf/veeam/veeam_backup_6_0_whats_new.pdf, Veeam Software Inc., (Nov. 18, 2011).
Ravindra Teli, et al.; Optimized Restore of Virtual Machine and Virtual Disk Data; U.S. Appl. No. 13/661,258, filed Oct. 26, 2012.
Amit Haridas Rangari, et al.; Systems and Methods for Enabling Migratory Virtual Machines to Expedite Access to Resources; U.S. Appl. No. 13/928,340, filed Jun. 26, 2013.
"How to configure and use Exchange Granular Restore in NetBackup 6.5.3 and Later.", Symantec Corporation; Article ID: TECH66342, (Jan. 29, 2008).

\* cited by examiner

SYSTEMS AND METHODS FOR PREFETCHING SUBSEQUENT DATA SEGMENTS IN RESPONSE TO DETERMINING THAT REQUESTS FOR DATA ORIGINATE FROM A SEQUENTIAL-ACCESS COMPUTING JOB

BACKGROUND

In an era of constant connectivity, a backup that requires a significant amount of time to access can be a severe liability. Computing devices are prone to a wide variety of both temporary and fatal errors, and even temporary losses of data or services may be devastating to enterprises. The ability to quickly recover systems, such as virtual machines, from a backup is crucial to enterprises that wish to maintain consistent services.

Traditional systems for recovering virtual machines may suffer from delays and bottlenecks. One common bottleneck is memory access. A virtual machine recovery job may need to retrieve a large amount of sequential data from a storage system or multiple storage systems that may not be optimized for such requests. Storage systems that incorporate a cache may be optimized to handle repeated requests for the same data and may not make effective use of the cache when handling requests for subsequent data segments. Accordingly, the instant disclosure identifies and addresses a need for additional and improved systems and methods for prefetching subsequent data segments.

SUMMARY

As will be described in greater detail below, the instant disclosure generally relates to systems and methods for prefetching subsequent data segments by determining that a plurality of requests for data segments are sequential and originate from a sequential-access computing job and then prefetching the next segment of data in the sequence before it is requested by the sequential-access computing job. For example, these systems and methods may distinguish sequential read requests performed in the live migration of a virtual machine from random-access read requests performed by the virtual machine in order to prefetch additional sequential data for the live migration of the virtual machine.

In one example, a computer-implemented method for prefetching subsequent data segments may include (1) identifying a storage system that receives sequential read requests from a sequential-access computing job and random-access read requests from a random-access computing job, (2) observing a plurality of requests to read a plurality of data segments stored by the storage system, (3) determining that the plurality of data segments are stored contiguously by the storage system and that the plurality of requests originate from the sequential-access computing job, and (4) prefetching a subsequent data segment that is directly subsequent to the plurality of data segments. Prefetching the subsequent data may be performed in response to determining that the plurality of requests originate from the sequential-access computing job.

In one embodiment, the computing jobs may be part of a virtual machine. In this embodiment, the sequential-access computing job may include a live migration of a virtual machine that stores data on the storage system and the plurality of requests may include read requests to save the plurality of data segments to a target location of the live migration of the virtual machine. Additionally or alternatively, the random-access computing job may include an application running within a virtual machine and the plurality of requests may include input/output requests to save the plurality of data segments to a storage location for the operation of the virtual machine.

In some examples, observing the plurality of requests may include observing a plurality of requests that meet a predetermined size threshold.

Determining that the plurality of requests originate from the sequential-access computing job may be accomplished in a variety of ways. In some examples, determining that the plurality of requests originate from the sequential-access computing job may include determining that each of the plurality of data segments are of an expected fixed size that is used for read requests made by the sequential-access computing job.

According to various embodiments, prefetching the subsequent data segment may include receiving a message from the sequential-access computing job and prefetching the subsequent data segment based on the message.

In some embodiments, the computer-implemented method may further including observing and/or handling a variety of additional requests for data from the storage system. For example, the computer-implemented method may further include observing subsequent requests for the subsequent data segment and prefetching an additional data segment that directly follows the subsequent data segment within the sequence of data stored by the storage system. Additionally or alternatively, the computer-implemented method may further include observing an additional plurality of requests from the sequential-access computing job for an additional plurality of data segments within the sequence of data that do not directly follow the subsequent data segment. In such embodiments, prefetching an additional data segment that directly follows the additional plurality of data segments.

In one example, the computer-implemented method may further include (1) observing an additional request for an additional data segment that does not directly follow the subsequent data segment, (2) determining that the additional request originates from the random-access computing job, and (3) retrieving the additional data segment from the shared storage system without prefetching a supplementary data segment directly subsequent to the additional data segment.

In one embodiment, a system for implementing the above-described method may include (1) an identification module that identifies a storage system that receives sequential read requests from a sequential-access computing job and random-access read requests from a random-access computing job, (2) an observation module that observes a plurality of requests to read a plurality of data segments stored by the storage system, (3) a determination module that determines that the plurality of data segments are stored contiguously by the storage system and that the plurality of requests originate from the sequential-access computing job, (4) a prefetching module that prefetches, in response to determining that the plurality of requests originate from the sequential-access computing job, a subsequent data segment that is directly subsequent to the plurality of data segments, and (5) at least one processor configured to execute the identification module, the observation module, the determination module, and the prefetching module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a storage system that receives sequential read requests from a sequential-access computing job and random-access read requests from a random-access computing job, (2) observe a plurality of requests to read a plurality of data segments stored by the storage system, (3) determine that the plurality of data segments are stored contiguously by the storage system and that the plurality of requests originate from the sequential-access computing job, and (4) prefetch a subsequent data segment that is directly subsequent to the plurality of data segments.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for prefetching subsequent data segments. As will be explained in greater detail below, prefetching subsequent data for sequential-access computing jobs but not for random-access computing jobs may enable a storage system to respond more quickly to potentially large sequential-access computing jobs without slowing down performance for random-access computing jobs. For example, prefetching subsequent data for a virtual machine live migration job may significantly speed up disaster recovery operations.

The following will provide, with reference to FIGS. 1-2 and 4-5, detailed descriptions of exemplary systems for prefetching subsequent data segments. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
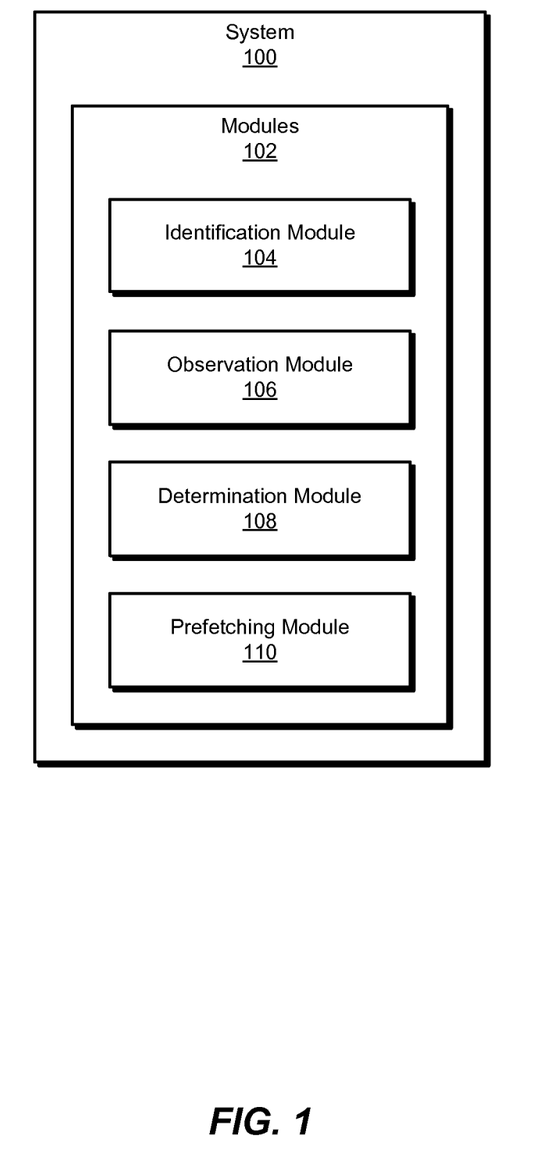
FIG. 1 is a block diagram of an exemplary system for prefetching subsequent data segments.

FIG. 1 is a block diagram of exemplary system 100 for prefetching subsequent data segments. As illustrated in this figure, exemplary system 100 may include one or more modules 102 for performing one or more tasks. For example, and as will be explained in greater detail below, exemplary system 100 may include an identification module 104 that may identify a storage system that receives sequential read requests from a sequential-access computing job and random-access read requests from a random-access computing job.

Exemplary system 100 may additionally include an observation module 106 that may observe a plurality of requests to read a plurality of data segments stored by the storage system. Exemplary system 100 may also include a determination module 108 that may determine that the plurality of data segments are stored contiguously by the storage system and that the plurality of requests originate from the sequential-access computing job.

Exemplary system 100 may additionally include a prefetching module 110 that may prefetch a subsequent data segment that is directly subsequent to the plurality of data segments after having determined that it is the sequential-access job making the requests for data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
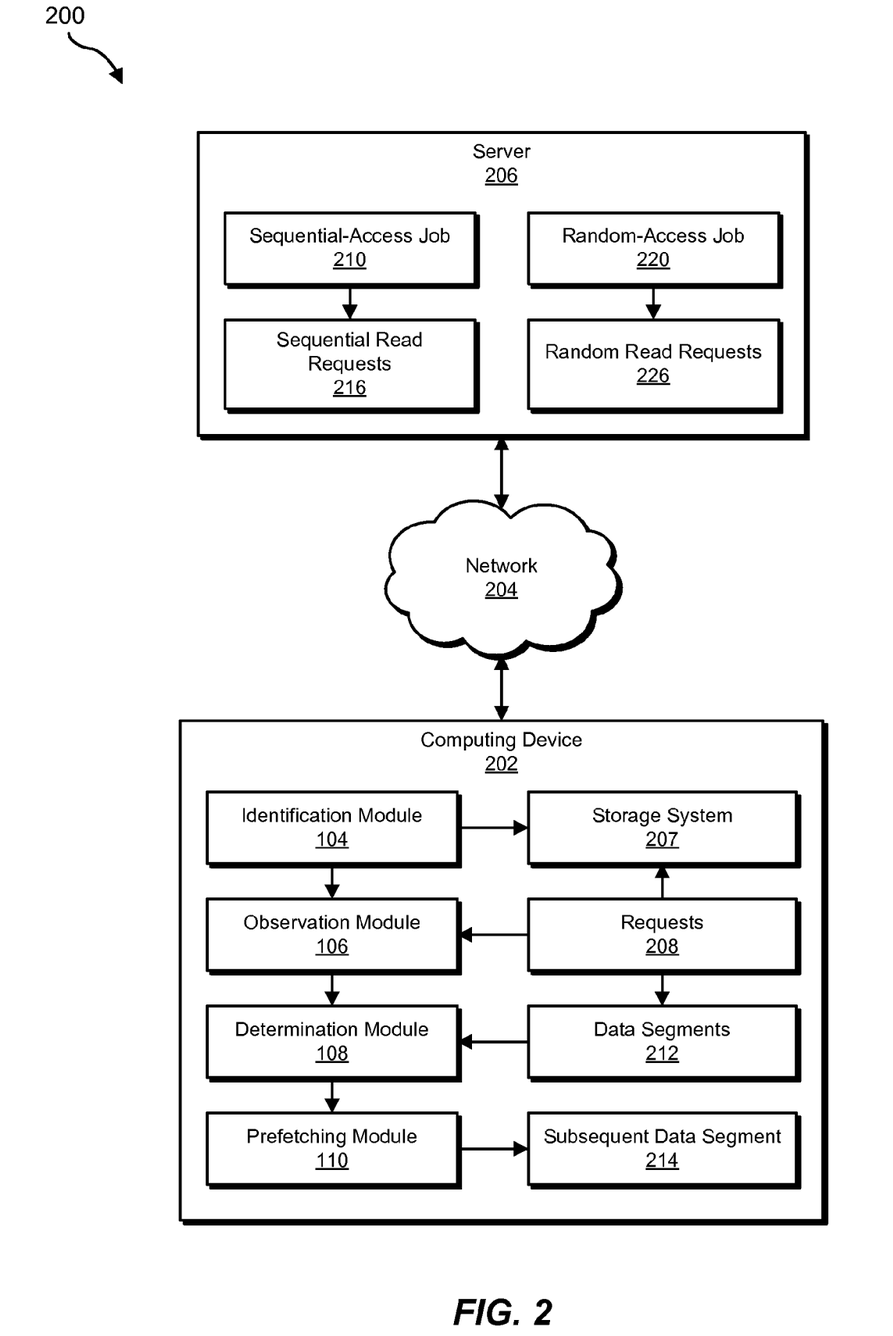
FIG. 2 is a block diagram of an exemplary network environment for prefetching subsequent data segments.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, cause computing device 202 and/or server 206 to prefetch subsequent data segments. In some embodiments, random-access job 220 and/or sequential-access job 210 may be performed from server 206, and modules 102 and/or storage system 207 may be located on computing device 202. In some examples of this embodiment, random-access job 220 and/or sequential-access job 210 may be part of a virtual machine operating on server 206. In other embodiments, modules 102 and/or storage system 207 may be located on an additional server.

For example, and as will be described in greater detail below, identification module 104 may be programmed to identify a storage system 207 that receives sequential read requests 216 from a sequential-access job 210 and random-access read requests from a random-access job 220. Observation module 106 may be programmed to observe a plurality of requests 208 to read a plurality of data segments 212 stored by storage system 207. Determination module 108 may be programmed to determine that plurality of data segments 212 are stored contiguously by storage system 207 and that plurality of requests 208 originate from sequential-access job 210. Prefetching module 110 may be programmed to prefetch a subsequent data segment 214 that is directly subsequent to plurality of data segments 212, in response to determining that plurality of requests 208 originate from sequential-access computing job 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of hosting computing jobs. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
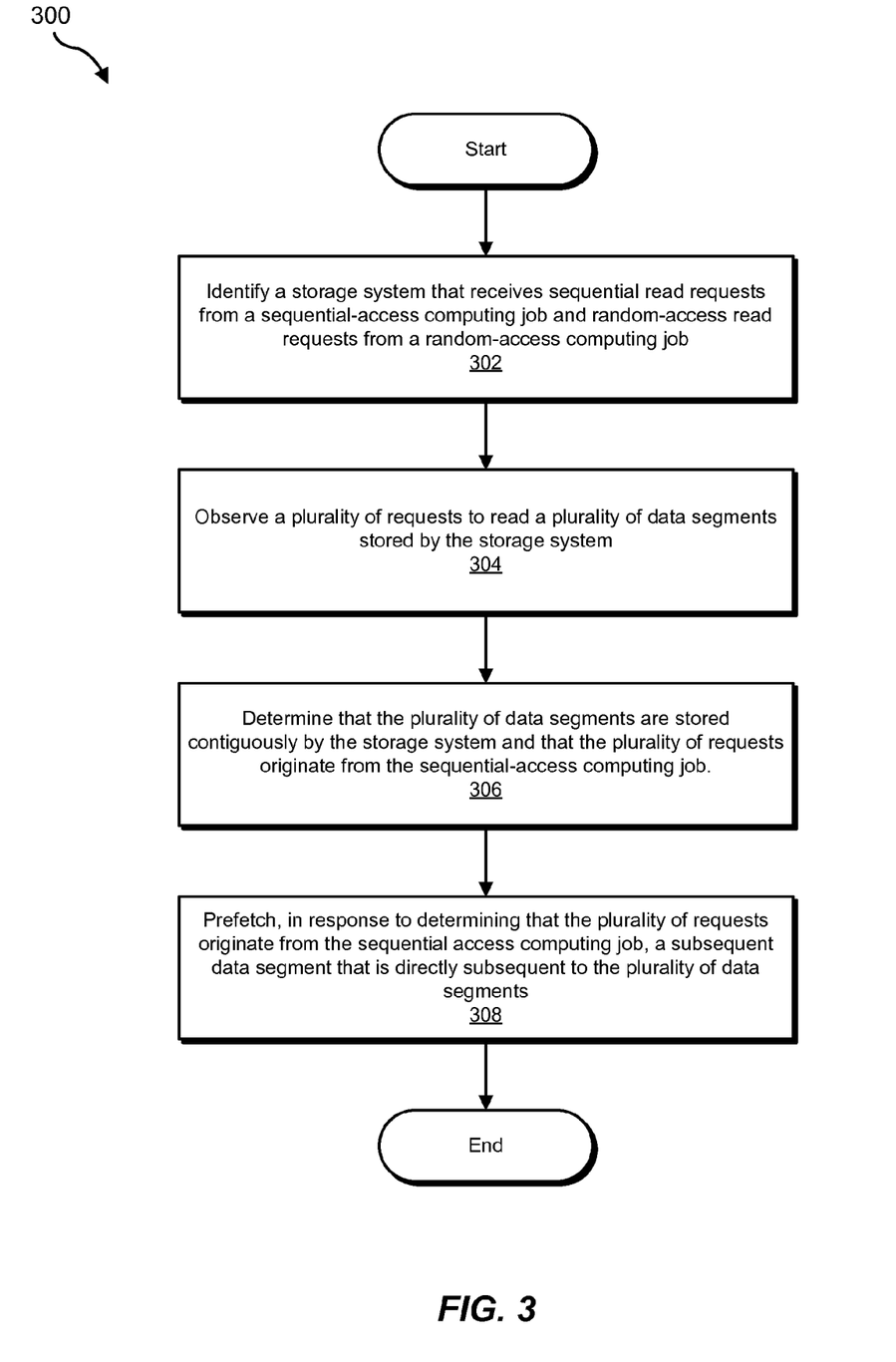
FIG. 3 is a flow diagram of an exemplary method for prefetching subsequent data segments.

FIG. 3 is a flow diagram of an exemplary computer-implemented method 300 for prefetching subsequent data segments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a storage system that receives sequential read requests from a sequential-access computing job and random-access read requests from a random-access computing job. For example, at step 302 identification module 104 may, as part of computing device 202 in FIG. 2, identify storage system 207 that receives sequential read requests 216 from sequential-access job 210 and random-access read requests from random-access job 220.

Identification module 104 may identify a storage system in any of a variety of ways and contexts. For example, identification module 104 may identify a storage system that receives read requests of various types from different jobs, including at least one random-access job and at least one sequential-access job. In one example, identification module 104 may identify a storage system that receives random read requests from an application within a virtual machine and sequential read requests from a live migration of the virtual machine.

As used herein, the phrase "virtual machine" generally refers to any operating system environment that is abstracted from computing hardware by a virtual machine manager (e.g., a hypervisor). The phrase "virtual machine live migration," as used herein, generally refers to any process which reads virtual machine backup data in order to restore the operation of a virtual machine on a computing system. In some examples, a virtual machine live migration may be taking place during disaster recovery operations. In these examples, the speed of the live migration job may be important to ensure consistent services.

The phrase "sequential-access computing job," as used herein, generally refers to any computing process and/or task performed by a computing process that may make requests for contiguous segments of data. A sequential-access computing job may not exclusively make requests for contiguous data segments. Examples of a sequential-access computing job include a virtual machine live migration job and/or a data streaming job.

The phrase "random-access computing job," as used herein, may refer to any computing process and/or task performed by a computing process that generally makes requests for non-contiguous segments of data. A random-access computing job may make requests for several sequential data segments, but may typically not make requests for contiguous data segments in sequential order. Examples of a random-access computing job include tasks performed by computing applications, such as applications within a virtual machine, and/or a bootstrap process of a virtual machine.

The phrase "sequential read requests," as used herein, generally refers to any series of at least two requests to read contiguous sections of data. The phrase "random read requests," as used herein, may refer to any series of requests for non-contiguous segments of data. In some examples, a storage system may receive both sequential read requests and random read requests simultaneously during a virtual machine live migration.

The phrase "storage system," as used herein, generally refers to any type or form of volatile or non-volatile storage device or medium capable of storing data and/or other computer-readable instructions. A storage system may include a cache. Examples of storage systems include, without limitation, Random Access Memory (RAM), Read Only Memory (ROM), flash memory, a physical disk, a virtual disk, a virtual disk file, a file system partition, a logical volume, an image, a database, and/or a collection of files defined by a backup policy.

At step 304 one or more of the systems described herein may observe a plurality of requests to read a plurality of data segments stored by the storage system. For example, at step 304 observation module 106 may, as part of computing device 202 in FIG. 2, observe plurality of requests 208 to read plurality of data segments 212 stored by storage system 207.

Observation module 106 may observe the plurality of read requests in a variety of ways and/or contexts. For example, observation module 106 may observe a plurality of read requests to read a plurality of data segments stored within a storage system. In one example, observation module 106 may observe a plurality of read requests for virtual machine backup data that is stored by a virtual machine recovery system.

In some embodiments, observation module 106 may observe the plurality of requests to the storage system by observing a plurality of requests that meet a predetermined size threshold. Observation module 106 may calculate the predetermined size threshold based on the type of job making the read requests, or may be the same for any type of job. In some examples, observation module 106 may base the predetermined size threshold on the minimum number of sequential requests necessary to determine that a job is making sequential requests and not random requests. For example, the predetermined threshold for a virtual machine live migration job may be 10 MB total of requested sequential data.

Figure 4:
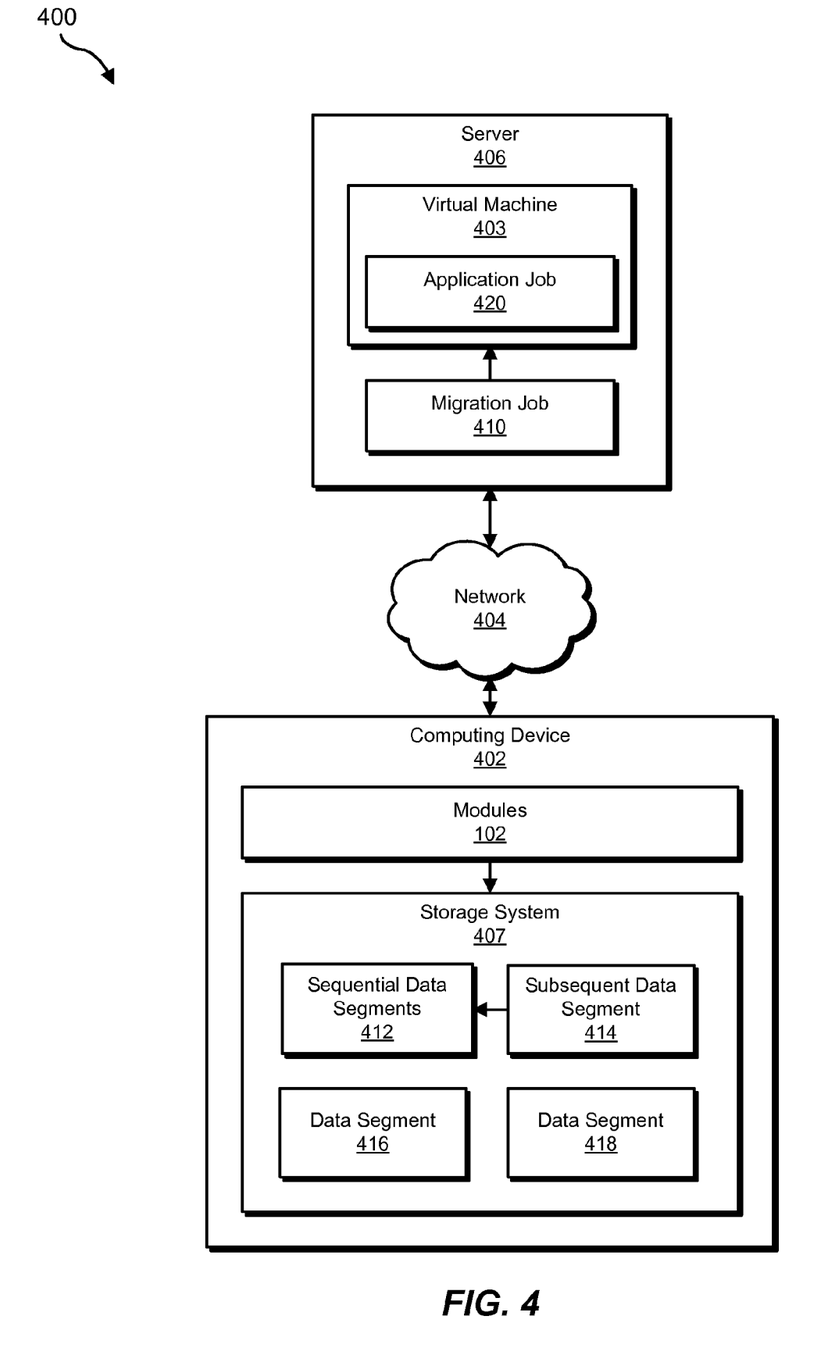
FIG. 4 is a block diagram of an exemplary network environment with an application job running on a virtual machine according to embodiments described herein.

In some embodiments, systems described herein may be operating in the context of a virtual machine. FIG. 4 is a block diagram of an exemplary computing system 400 for prefetching subsequent data segments. As illustrated in FIG. 4, server 406 may include virtual machine 403 and/or migration job 410, and may be connected to computing device 402 via network 404. Virtual machine 403 may include application job 420. Computing device 402 may include modules 102 and/or storage system 407. Storage system 407 may include sequential data segments 412, subsequent data segment 414, data segment 416 and/or data segment 418.

In some examples, the sequential-access computing job may include a live migration of a virtual machine that stores data on the storage system and the plurality of requests may include read requests to save the plurality of data segments to a target location of the live migration of the virtual machine. For example, as illustrated in FIG. 4, migration job 410 may be making read requests in order to complete a live migration of virtual machine 403. Migration job 410 may make a plurality of requests to storage system 407 for sequential data segments 412. Systems described herein may prefetch subsequent data segment 414 based on migration job 410 making the plurality of requests for sequential data segments 412. Data segments 412 and/or subsequent data segment 412 may be virtual machine backup data that may be required for the live migration of virtual machine 403.

In some examples, the random-access computing job may include an application running within a virtual machine and the plurality of requests may include input/output requests to save the plurality of data segments to a storage location for the operation of the virtual machine. For example, as illustrated in FIG. 4, application job 420 may be running within virtual machine 403 on server 406. Application job 420 may make a request for data segment 416. Application job may also make a request for data segment 418, which may not be subsequent to data segment 416. Data segment 416 and/or data segment 418 may be virtual machine application data.

Returning to FIG. 3, at step 306 one or more of the systems described herein may determine that the plurality of data segments are stored contiguously by the storage system and that the plurality of requests originate from the sequential-access computing job. For example, at step 306 determination module 108 may, as part of computing device 202 in FIG. 2, determine that plurality of data segments 212 are stored contiguously by storage system 207 and that plurality of requests 208 originate from sequential-access job 210.

Determination module 108 may determine that the plurality of data segments are stored contiguously in a variety of ways. For example, determination module 108 may determine that the plurality of data segments are part of a contiguous sequence stored by the storage system. In one example, determination module 108 may determine that the plurality of data segments are part of a contiguous sequence of virtual machine backup data stored on the storage system. In this example, the virtual machine backup data may be a snapshot of a virtual machine that may be used to resume the operation of the virtual machine on a computing system.

In some examples, determination module 108 may determine that the plurality of requests originate from the sequential-access computing job by determining that each of the plurality of data segments are of an expected fixed size that is used for read requests made by the sequential-access computing job. The expected fixed size may be the same for all sequential-access computing jobs that make requests of the storage system, or the expected fixed size may depend on the job. In one example, the expected fixed size of a read request from a virtual machine live migration job may be 32 KB (e.g., because the virtual machine live migration job is known to retrieve data in 32 KB chunks).

At step 308 one or more of the systems described herein may prefetch a subsequent data segment that is directly subsequent to the plurality of data segments after determining that it is the sequential-access computing job that is requesting data. For example, at step 308 prefetching module 110 may, as part of computing device 202 in FIG. 2, prefetch subsequent data segment 214 that is directly subsequent to plurality of data segments 212, in response to determining that plurality of requests 208 originate from sequential-access job 210.

Prefetching module 110 may prefetch the subsequent data segment in any of a variety of ways. For example, prefetching module 110 may prefetch a subsequent data segment that directly follows the plurality of data segments due to determining that the plurality of requests originate from the sequential-access job. In one example, prefetching module 110 may populate a cache with a subsequent data segment including virtual machine recovery data in response to determining that the plurality of requests originate from a virtual machine live migration job.

In some embodiments, the subsequent data segment may be significantly larger than the individual data segments requested by the sequential-access job. For example, prefetching module 110 may observe 10 MB total of requests for 32 KB each, and may prefetch an additional 10 MB of subsequent data.

In some examples, prefetching module 110 may prefetch the subsequent data segment by receiving a message from the sequential-access computing job and prefetching the subsequent data segment based on the message. For example, prefetching module 110 may receive a message from the sequential-access computing job that the sequential-access computing job requires a large amount of sequential data, and may prefetch the subsequent data segment based on the message. In one example, prefetching module 110 may receive an application hint from a virtual machine live migration job indicating that a virtual machine live migration is in progress and may prefetch the subsequent segment of virtual machine data based on the application hint.

Figure 5:
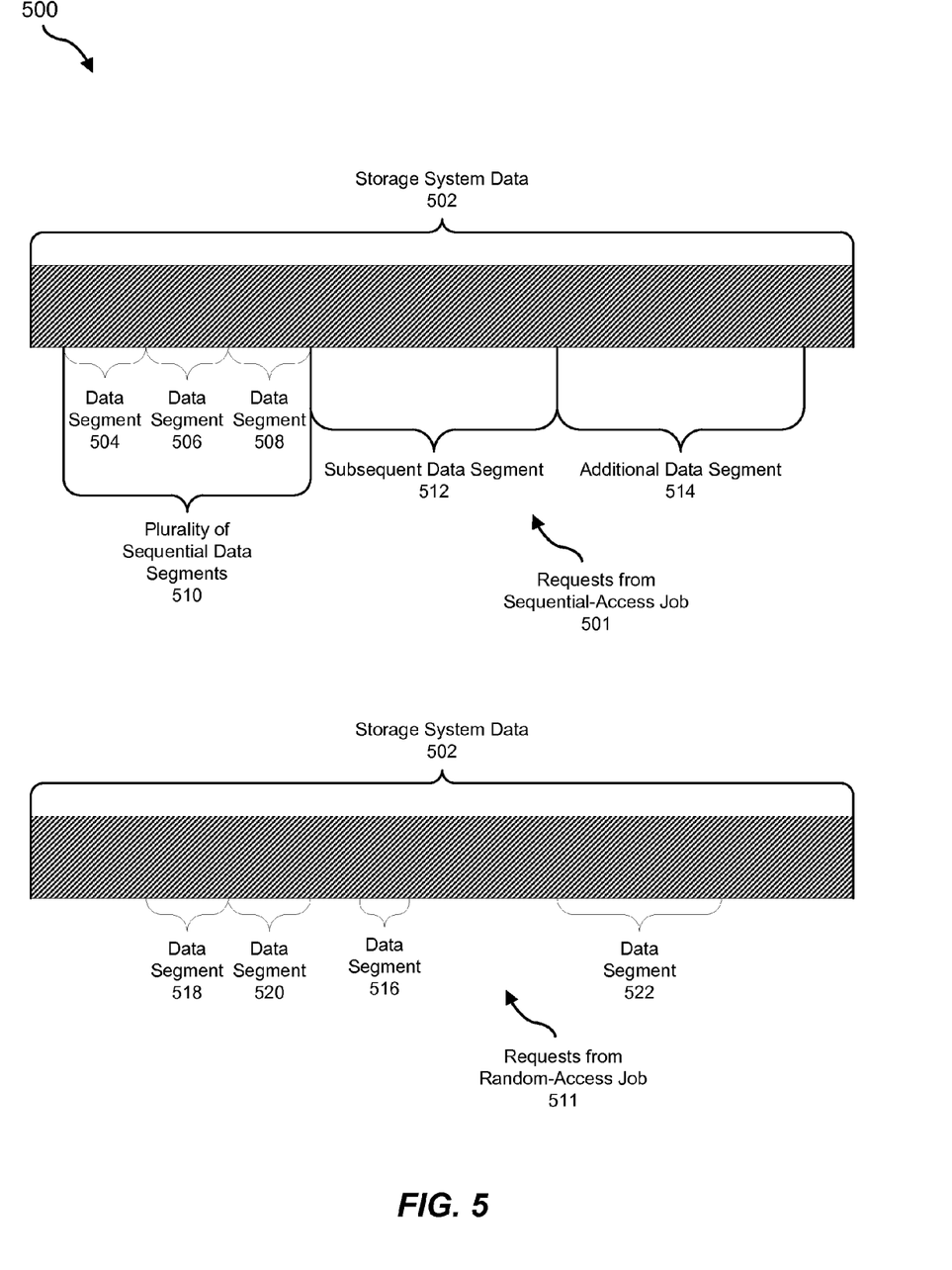
FIG. 5 is a block diagram of exemplary data segments that may be prefetched according to embodiments described herein.

In some examples, systems described herein may prefetch additional data based on additional requests. FIG. 5 illustrates exemplary data segments requested by different jobs within exemplary system for prefetching subsequent data 500. Requests for data stored within storage system 502 originating from sequential-access job 501 may include requests for a plurality of sequential data segments 510 which may include data segments 504, 506 and/or 508, requests for subsequent data segment 512, and/or requests for additional data segment 514. Requests for data stored within storage system 502 originating from random-access job 511 may include requests for data segments 516, 518, 520 and/or 522. Random-access job 511 may make the exemplary requests in any order. For example, random-access job 511 may request data segment 516 and then may request data segment 518 that is not subsequent to data segment 516.

In some examples, systems described herein may observe subsequent requests for the subsequent data segment and prefetch an additional data segment that directly follows the subsequent data segment within the sequence of data stored by the storage system. Prefetching the subsequent data additional may occur after observing requests for the entirety of the subsequent data segment and/or after observing requests for some part of the subsequent data segment. For example, as illustrated in FIG. 5, sequential-access job 501 may make requests for plurality of data segments 510, which may cause systems described herein to prefetch subsequent data segment 512. Sequential-access job 501 may then make requests for data segments within subsequent data segment 512, which may cause systems described herein to prefetch additional data segment 514 that directly follows subsequent data segment 512.

In some examples, systems described herein may (1) observe an additional request for an additional data segment that does not directly follow the subsequent data segment, (2) determine that the additional request originates from the random-access computing job, and (3) retrieve the additional data segment from the shared storage system without prefetching a supplementary data segment directly subsequent to the additional data segment.

For example, as illustrated in FIG. 5, systems described herein may observe a request for data segment 516 that does not directly follow subsequent data segment 512. In some examples, systems described herein may determine that the request for data segment 516 originates from random-access job 511 based on data segment 516 not being of a fixed size that is used for read requests made by sequential-access job 501. In one example, systems described herein may also observe a request for data segment 520 that is not subsequent to data segment 516. In this example, systems described herein may determine that the request for data segment 516 and/or the request for data segment 520 originates from random-access job 511 because data segment 520 is not subsequent to data segment 516.

In some examples, systems described herein may observe an additional plurality of requests from the sequential-access computing job for an additional plurality of data segments within the sequence of data that do not directly follow the subsequent data segment, and prefetch an additional data segment that directly follows the additional plurality of data segments. For example, the sequential-access job may make a plurality of requests for contiguous data segments, and then make a request for an additional segment of data that is not subsequent to the contiguous data segments. In this example, the random-access job may then make an additional plurality of requests for contiguous data that is subsequent to the additional segment of data. In one example, a virtual machine live migration job may make a plurality of requests for sequential data, and then may skip ahead to a different sequence of data because the intervening data may be in use by the virtual machine application.

As explained above in connection with method 300 in FIG. 3, systems described herein may identify a storage system that receives read requests from a variety of sources, among them a sequential-access computing job and a random-access computing job. In some embodiments, the sequential-access computing job and/or the random-access computing job may be a part of a virtual machine.

Systems described herein may observe requests to read data segments, and may determine that the data segments are stored contiguously by the storage system and that the requests originate from the sequential-access computing job. This determination may be made in a number of ways. In some examples, systems described herein may determine that the data segments are stored contiguously by observing that the data segments are of a fixed size used by the sequential-access job and/or by receiving a message from the sequential-access job that sequential data segments will be required. In some examples, systems described herein may not attempt to make determinations about the data segments until a predetermined threshold for the size of the data segments has been met.

Systems described herein may, based on determining that the requests originate from the sequential-access computing job, prefetch subsequent data. If the sequential-access job continues reading the subsequent data in sequential order, systems described herein may continue to prefetch additional subsequent data until the pattern of sequential data access is disrupted. If the sequential-access job resumes making sequential requests, systems described herein may then prefetch additional data subsequent to the new sequential requests. By prefetching subsequent data only in response to sequential data requests and not in response to random data requests, systems described herein may speed up the retrieval of large amounts of sequential data without slowing down the retrieval of small amounts of random data. This may have a significant impact on the speed of operations such as virtual machine live migrations, which may require substantial amounts of sequential data.

Figure 6:
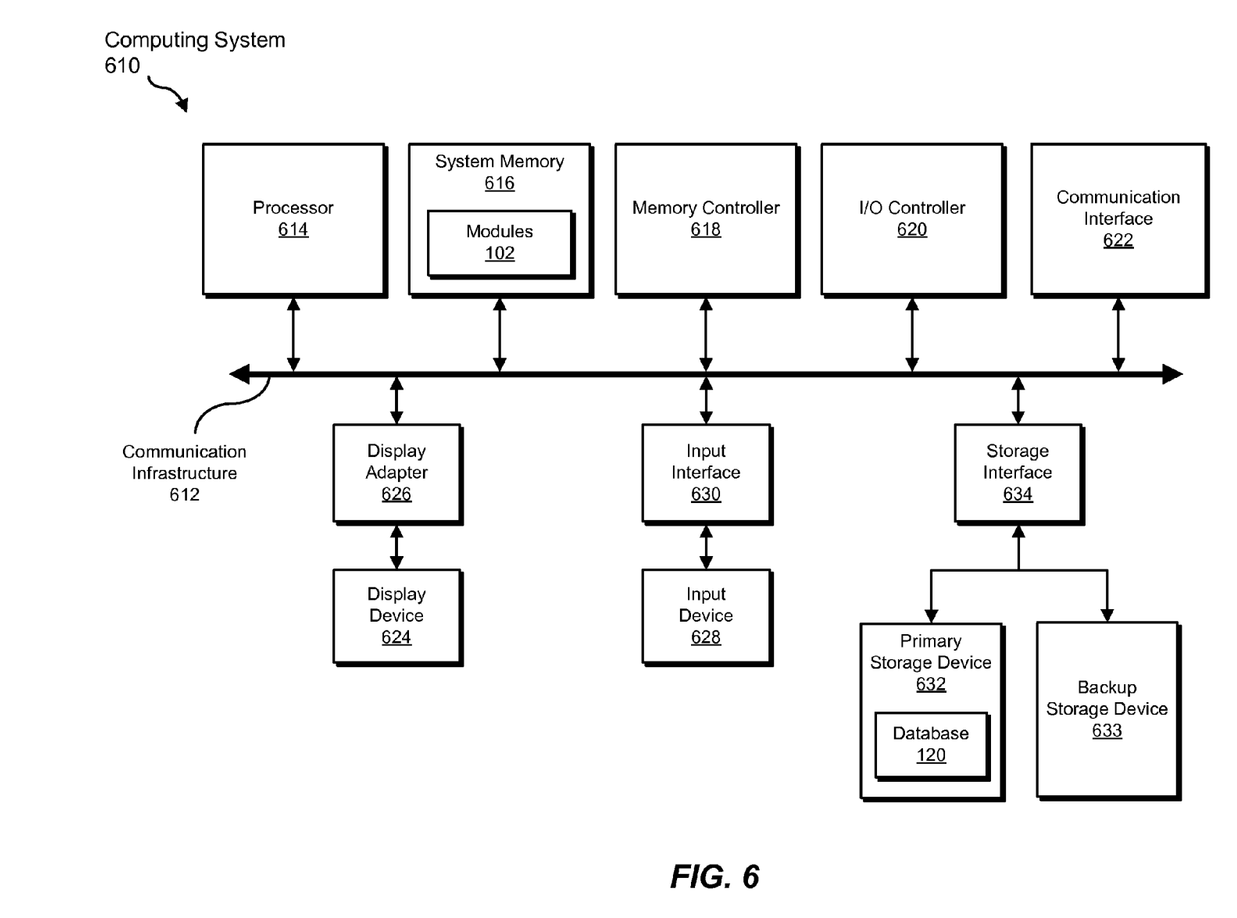
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations.

For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
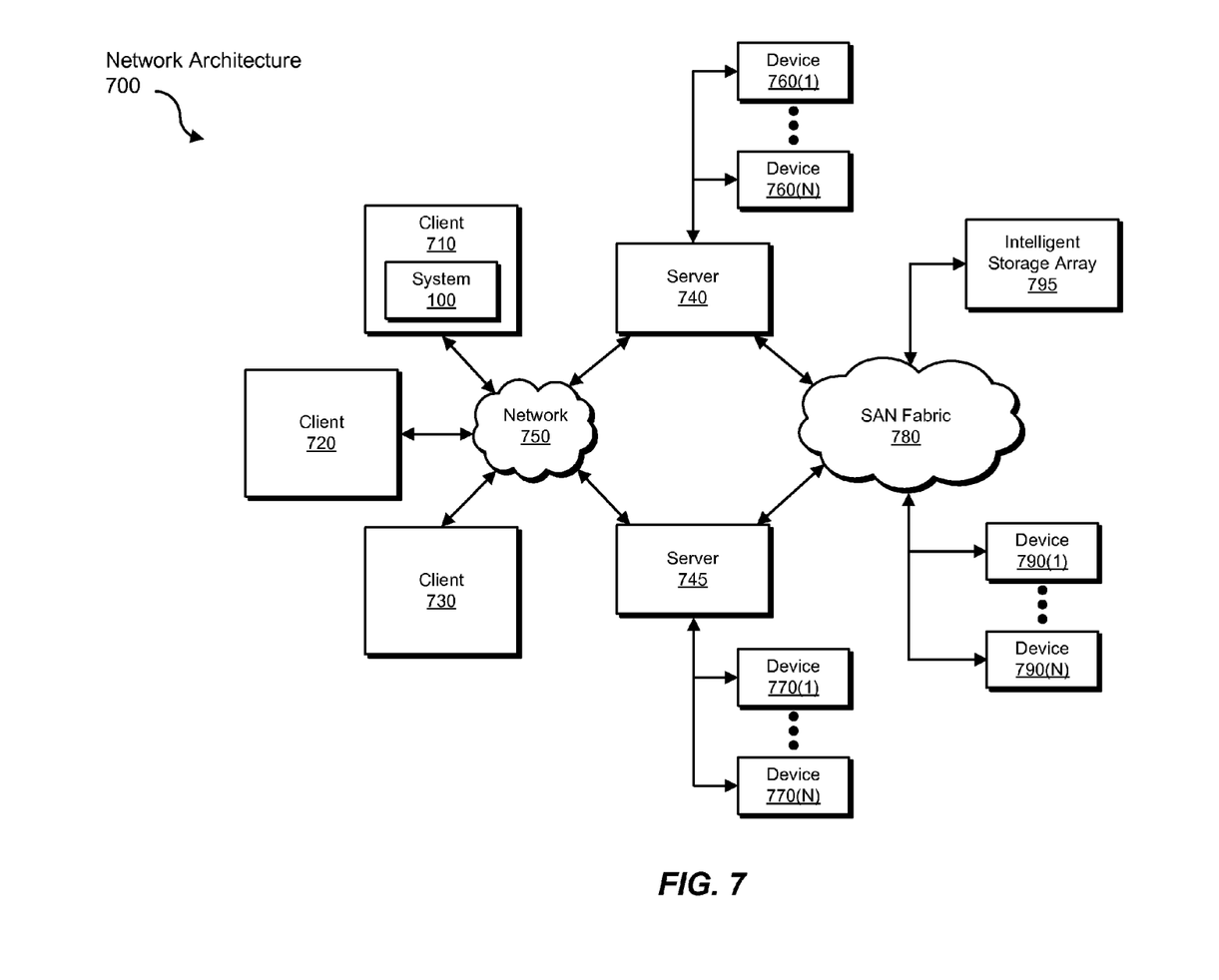
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for prefetching subsequent data segments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive requests for data segments to be transformed, transform the data segments, output a result of the transformation to a cache, use the result of the transformation to prefetch additional data, and store the result of the transformation to a cache. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for prefetching subsequent data segments, at least a portion of the method being performed by a computing device comprising at least one processor, the method comprising:
    identifying a storage system that receives sequential read requests from a sequential-access computing job that makes requests for contiguous segments of data and random-access read requests from a random-access computing job that makes requests for non-contiguous segments of data;
    observing a plurality of requests to read a plurality of data segments stored by the storage system, wherein the plurality of requests meet a predetermined size threshold for total size of requests observed;
    determining, in response to observing the plurality of requests that meets the predetermined size threshold, that the plurality of data segments are stored contiguously by the storage system and that the plurality of requests originate from the sequential-access computing job based at least in part on determining that each of the plurality of data segments are of an expected fixed size that is used for read requests made by the sequential-access computing job and that depends on a type of job making read requests of the storage system; and
    prefetching a subsequent data segment that is stored directly subsequent to the plurality of data segments in response to determining that the plurality of requests originate from the sequential-access computing job and not from the random-access computing job.

2. The computer-implemented method of claim 1, wherein the sequential-access computing job comprises a live migration of a virtual machine that stores data on the storage system and the plurality of requests comprise read requests to save the plurality of data segments to a target location of the live migration of the virtual machine.

3. The computer-implemented method of claim 1, wherein the random-access computing job comprises an application running within a virtual machine and the plurality of requests comprise input/output requests to save the plurality of data segments to a storage location for the operation of the virtual machine.

4. The computer-implemented method of claim 1, wherein observing the plurality of requests to the storage system comprises observing a plurality of requests that meet a predetermined threshold for number of requests.

5. The computer-implemented method of claim 1, wherein prefetching the subsequent data segment comprises prefetching a plurality of subsequent data segments.

6. The computer-implemented method of claim 1, wherein prefetching the subsequent data segment comprises receiving a message from the sequential-access computing job and prefetching the subsequent data segment based on the message.

7. The computer-implemented method of claim 1, further comprising:
    observing subsequent requests for the subsequent data segment; and
    prefetching an additional data segment that directly follows the subsequent data segment within the sequence of data stored by the storage system.

8. The computer-implemented method of claim 1, further comprising:
    observing an additional plurality of requests from the sequential-access computing job for an additional plurality of data segments within the sequence of data that do not directly follow the subsequent data segment; and
    prefetching an additional data segment that directly follows the additional plurality of data segments.

9. The computer-implemented method of claim 1, further comprising:
    observing an additional request for an additional data segment that does not directly follow the subsequent data segment;
    determining that the additional request originates from the random-access computing job; and
    retrieving the additional data segment from the shared storage system without prefetching a supplementary data segment directly subsequent to the additional data segment.

10. A system for prefetching subsequent data segments, the system comprising:
    an identification module, stored in memory, that identifies a storage system that receives sequential read requests from a sequential-access computing job that makes requests for contiguous segments of data and random-access read requests from a random-access computing job that makes requests for non-contiguous segments of data;
    an observation module, stored in memory, that observes a plurality of requests to read a plurality of data segments stored by the storage system, wherein the plurality of requests meet a predetermined size threshold for total size of requests observed;
    a determination module, stored in memory, that determines, in response to observing the plurality of requests that meets the predetermined size threshold, that the plurality of data segments are stored contiguously by the storage system and that the plurality of requests originate from the sequential-access computing job based at least in part on determining that each of the plurality of data segments are of an expected fixed size that is used for read requests made by the sequential-access computing job and that depends on a type of job making read requests of the storage system;
    a prefetching module, stored in memory, that prefetches, in response to determining that the plurality of requests originate from the sequential-access computing job and not the random-access computing job, a subsequent data segment that is stored directly subsequent to the plurality of data segments; and
    at least one processor configured to execute the identification module, the observation module, the determination module, and the prefetching module.

11. The system of claim 10, wherein the sequential-access computing job comprises a live migration of a virtual machine that stores data on the storage system and the plurality of requests comprise read requests to save the plurality of data segments to a target location of the live migration of the virtual machine.

12. The system of claim 10, wherein the random-access computing job comprises an application running within a virtual machine and the plurality of requests comprise input/output requests to save the plurality of data segments to a storage location for the operation of the virtual machine.

13. The system of claim 10, wherein the observation module observes the plurality of requests to the storage system by observing a plurality of requests that meet a predetermined threshold for number of requests.

14. The system of claim 10, wherein the prefetching module prefetches the subsequent data segment by prefetching a plurality of subsequent data segments.

15. The system of claim 10, wherein the prefetching module prefetches the subsequent data segment by receiving a message from the sequential-access computing job and prefetching the subsequent data segment based on the message.

16. The system of claim 10, wherein:
the observation module observes subsequent requests for the subsequent data segment; and
the prefetching module prefetches an additional data segment that directly follows the subsequent data segment within the sequence of data stored by the storage system.

17. The system of claim 10, wherein:
the observation module observes an additional plurality of requests from the sequential-access computing job for an additional plurality of data segments within the sequence of data that do not directly follow the subsequent data segment; and
the prefetching module prefetches an additional data segment that directly follows the additional plurality of data segments.

18. The system of claim 10, further comprising:
the observation module observes an additional request for an additional data segment that does not directly follow the subsequent data segment;
the determination module determines that the additional request originates from the random-access computing job; and a retrieving module that retrieves the additional data segment from the shared storage system without prefetching a supplementary data segment directly subsequent to the additional data segment.

19. A non-transitory computer-readable-storage medium comprising one or more computer-readable instructions that, when executed by at least one processor of a computing device, cause the computing device to:
identify a storage system that receives sequential read requests from a sequential-access computing job that makes requests for contiguous segments of data and random-access read requests from a random-access computing job that makes requests for non-contiguous segments of data;
observe a plurality of requests to read a plurality of data segments stored by the storage system, wherein the plurality of requests meet a predetermined size threshold for total size of requests observed;
determine, in response to observing the plurality of requests that meets the predetermined size threshold, that the plurality of data segments are stored contiguously by the storage system and that the plurality of requests originate from the sequential-access computing job based at least in part on determining that each of the plurality of data segments are of an expected fixed size that is used for read requests made by the sequential-access computing job and that depends on a type of job making read requests of the storage system; and
prefetch a subsequent data segment that is stored directly subsequent to the plurality of data segments in response to determining that the plurality of requests originate from the sequential-access computing job and not from the random-access computing job.

20. The non-transitory computer-readable-storage medium of claim 19, wherein the one or more computer-readable instructions cause the computing device to identify the sequential-access computing job that comprises a live migration of a virtual machine that stores data on the storage system and the plurality of requests that comprise read requests to save the plurality of data segments to a target location of the live migration of the virtual machine.

* * * * *